United States Patent
Livshitz et al.

(10) Patent No.: US 11,644,560 B2
(45) Date of Patent: May 9, 2023

(54) TRACKING RADAR TARGETS REPRESENTED BY MULTIPLE REFLECTION POINTS

(71) Applicant: TEXAS INSTRUMENTS INCORPORATED, Dallas, TX (US)

(72) Inventors: Michael Livshitz, Rockville, MD (US); Mingjian Yan, Gaithersburg, MD (US)

(73) Assignee: Texas Instmments Incorporated, Dallas, TX (US)

( * ) Notice: Subject to any disclaimer, the term of this patent is extended or adjusted under 35 U.S.C. 154(b) by 289 days.

(21) Appl. No.: 16/911,042

(22) Filed: Jun. 24, 2020

(65) Prior Publication Data
US 2021/0405178 A1    Dec. 30, 2021

(51) Int. Cl.
*G01S 13/58* (2006.01)
*G01S 17/58* (2006.01)

(52) U.S. Cl.
CPC ............ *G01S 13/584* (2013.01); *G01S 17/58* (2013.01)

(58) Field of Classification Search
CPC ................ G01S 13/584; G01S 17/58; G01S 2013/9323; G01S 7/415; G01S 13/931; G01S 13/44; G01S 13/726; G01S 13/34; G01S 17/34; G01S 17/66; G01S 7/354; G01S 17/89; G01S 2013/9321; G01S 13/66
See application file for complete search history.

(56) References Cited

U.S. PATENT DOCUMENTS

| | | | | |
|---|---|---|---|---|
| 6,229,475 | B1 * | 5/2001 | Woolley | G01S 13/449 |
| | | | | 342/194 |
| 2007/0008210 | A1 * | 1/2007 | Kibayashi | G01S 13/726 |
| | | | | 342/107 |
| 2016/0103213 | A1 * | 4/2016 | Ikram | G01S 13/42 |
| | | | | 342/105 |
| 2019/0331784 | A1 * | 10/2019 | Niesen | G01S 13/726 |
| 2020/0326418 | A1 * | 10/2020 | Keijer | G01S 13/72 |
| 2021/0116540 | A1 * | 4/2021 | Santra | G06V 10/30 |
| 2021/0199792 | A1 * | 7/2021 | Emadi | G01S 13/931 |
| 2021/0255280 | A1 * | 8/2021 | Santra | A61B 5/02405 |

* cited by examiner

*Primary Examiner* — Erin F Heard
*Assistant Examiner* — Juliana Cross
(74) *Attorney, Agent, or Firm* — Michael T. Gabrik; Frank D. Cimino

(57) ABSTRACT

Techniques for target tracking that include obtaining state information for a first target object, the state information including previous location information for the first target object and a previous group distribution for points associated with the first target object at a previous point in time, predicting a location for the first target object based on the obtained state information, receiving a first set of points, identifying a first distribution of points, from the first set of points based on the predicted location to associate one or more first points of the first distribution of points with the target object, determining a current group distribution for the points associated with the first target object, and outputting a current location information and a current group distribution point.

20 Claims, 8 Drawing Sheets

TRACKING RADAR TARGETS REPRESENTED BY MULTIPLE REFLECTION POINTS

BACKGROUND

Radar systems transmit electromagnetic (EM) wave signals that objects in the path of the EM signals then reflect. By capturing the reflected signal, a radar system can determine the range, velocity and angle of the objects. Millimeter wave (mmWave) is a class of radars that uses high-frequency, 30 GHz-300 GHz, EM waves with a corresponding short wavelength in the millimeter range. This short wavelength helps reduce the size of system components such as the antennas required to process mmWave signals. Another advantage of short wavelengths is relatively high accuracy afforded by such systems. For example, a mmWave system operating at 76-81 GHz (with a corresponding wavelength of about 4 mm), has the ability to detect movements that are as small as a fraction of a millimeter.

Traditional pulsed-radar systems transmit a short radar pulse periodically to obtain location information. Newer frequency modulated continuous wave (FMCW) mmWave radars transmit a frequency-modulated signal continuously in order to measure range as well as angle and velocity. With FMCW mmWave radar, targets are represented by a set (tens to hundreds) of reflection points. Each point carries range, angular, Doppler and signal-to-noise (SNR) information. Due to a fluctuating nature of the reflections, individual points may not persist from frame to frame, and reflection points from multiple targets may also overlap, which presents difficulties for traditional clustering and point tracking solutions. Therefore, it is desirable to have an improved technique for tracking radar targets represented by multiple reflection points.

SUMMARY

This disclosure relates to a technique, including obtaining state information for a first target object, the state information including previous location information for the first target object and a previous group distribution for points associated with the first target object at a previous point in time, predicting a location for the first target object based on the obtained state information, receiving a first set of points, identifying a first distribution of points, from the first set of points based on the predicted location to associate one or more first points of the first distribution of points with the target object, determining a current group distribution for the points associated with the first target object, and outputting a current location information and a current group distribution point.

Another aspect of the present disclosure relates to a device including a memory and one or more processors operatively coupled to the memory, wherein the one or more processors are configured to execute non-transitory instructions causing the one or more processors to obtain state information for a first target object, the state information including previous location information for the first target object and a previous group distribution for points associated with the first target object at a previous point in time, predict a location for the first target object based on the obtained state information, receive a first set of points, identify a first distribution of points, from the first set of points based on the predicted location to associate one or more first points of the first distribution of points with the target object, determine a current group distribution for the points associated with the first target object, and output a current location information and a current group distribution point.

Another aspect of the present disclosure relates to non-transitory program storage device comprising instructions stored thereon to cause one or more processors to obtain state information for a first target object, the state information including previous location information for the first target object and a previous group distribution for points associated with the first target object at a previous point in time, predict a location for the first target object based on the obtained state information, receive a first set of points, identify a first distribution of points, from the first set of points based on the predicted location to associate one or more first points of the first distribution of points with the target object, determine a current group distribution for the points associated with the first target object, and output a current location information and a current group distribution point.

It may be understood that while techniques herein are discussed in the context of FMCW mmWave radars, nothing in this disclosure is meant to limit these techniques to such sensors. Rather, the techniques discussed herein are readily applicable across a broad range of sensor devices, including, but not limited to Light Detection and Ranging (LiDAR) sensors including frequency-modulated, continuous wave LiDAR sensors or other sensors which can obtain similar information.

BRIEF DESCRIPTION OF THE DRAWINGS

For a detailed description of various examples, reference will now be made to the accompanying drawings in which.

DETAILED DESCRIPTION

Figure 1:
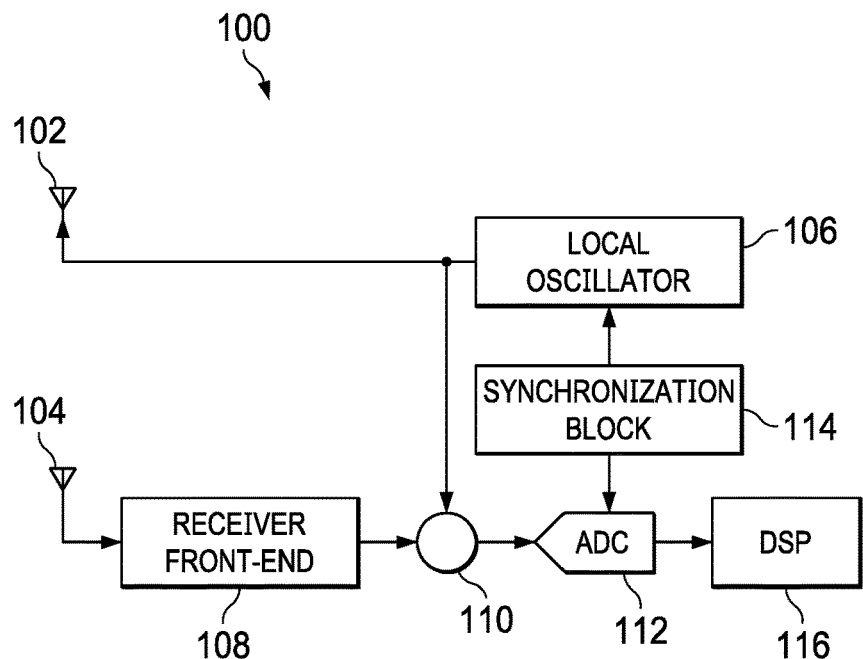
FIG. 1 illustrates a radar apparatus, according to an embodiment.

FIG. 1 illustrates a radar apparatus 100, according to an embodiment. In one example, the radar apparatus 100 is used for detecting radar targets, such as cars, pedestrians, walls, animals, etc. The radar apparatus 100 includes a transmit antenna unit 102 and a receive antenna unit 104. In an example, a single antenna unit functions as the transmit antenna unit 102 and the receive antenna unit 104. A local oscillator 106 is coupled to the transmit antenna unit 102. A receiver front-end 108 is coupled to the receive antenna unit 104.

A mixer 110 is coupled to the local oscillator 106 and the receiver front-end 108. An analog to digital converter (ADC) 112 is coupled to the mixer 110. A synchronization block 114 is coupled to the local oscillator 106 and the ADC 112. A digital signal processor (DSP) 116 is coupled to the ADC 112. The radar apparatus 100 may include one or more additional components known to those skilled in the relevant art and are not discussed here for simplicity of the description.

Turning to the operation of the radar apparatus 100 illustrated in FIG. 1, the local oscillator 106 generates a plurality of ramp segments. The plurality of ramp segments includes a first ramp segment and a second ramp segment. A slope of each ramp segment of the plurality of ramp segments generated by the local oscillator 106 is same. Therefore, a slope of the first ramp segment is equal to a slope of the second ramp segment. In an example, the local oscillator 106 includes a PLL (phase locked loop) that generates the first ramp segment and the second ramp segment.

In one example, a frequency of the ramp segments generated by the local oscillator 106 is digitally controlled by a register. In another example, the register controls a value of divide-by-N which is used in a feedback loop of the local oscillator 106. In a further example, the local oscillator 106 includes a first voltage controlled oscillator (VCO) and a second VCO that generates the first ramp segment and the second ramp segment respectively. In yet another example, a PLL includes the first VCO and the second VCO generating the first ramp segment and the second ramp segment respectively.

In an additional example, the local oscillator 106 includes a plurality of VCO's that generates a plurality of ramp segments. A time difference between generation of the first ramp segment and the second ramp segment includes a time taken in the local oscillator 106 to switch from the first VCO to the second VCO. In an example, the local oscillator 106 has a plurality of VCO's and each VCO has a predefined operating frequency range. The operating frequency range of each VCO of the plurality of VCO's is either contiguous or overlapping. Only one VCO of the plurality of VCO's is operational at a time instant.

A multiplexer is used, in one example, to select which VCO should operate at a given time instant. In another example, the local oscillator 106 includes a voltage controlled oscillator (VCO). The VCO includes a first tuning element and a second tuning element that generates the first ramp segment and the second ramp segment respectively.

The transmit antenna unit 102 transmits the first ramp segment and the second ramp segment. The first ramp segment and the second ramp segment are scattered by the one or more obstacles to generate a first received signal and a second received signal respectively. The receive antenna unit 104 receives the first received signal and the second received signal. In one version, the first received signal includes a plurality of delayed versions of the first ramp segment and the second received signal includes a plurality of delayed versions of the second ramp segment.

In another version, when the plurality of ramp segments are transmitted by the transmit antenna unit 102, the receive antenna unit 104 receives a plurality of received signals. The receiver front-end 108 amplifies the first received signal and the second received signal. The mixer 110 mixes the first ramp segment and the first received signal to generate a first IF (intermediate frequency) signal. Also, the mixer 110 mixes the second ramp segment and the second received signal to generate a second IF signal.

Each ramp segment includes a start frequency, a first frequency and a second frequency. Therefore, the first ramp segment and the second ramp segment each include the start frequency, the first frequency and the second frequency. In an example, the first frequency is less than the second frequency. A round trip delay is defined as a time difference between start of transmission of a ramp segment and start of reception of the corresponding received signal from an obstacle of the one or more obstacles. A maximum round trip delay is defined as a time difference between start of transmission of the first ramp segment and start of reception of the first received signal from a farthest obstacle of the one or more obstacles.

The farthest obstacle is an extreme obstacle which can be detected by the radar apparatus 100. The start frequency is less than the first frequency by at least a product of an absolute value of the slope of the first ramp segment and the maximum round trip delay when the slope of the first ramp segment and the second ramp segment are equal and positive. The start frequency is greater than the first frequency by at least a product of an absolute value of the slope of the first ramp segment and the maximum round trip delay when the slope of the first ramp segment and the second ramp segment are equal and negative.

In one example, the first frequency of the second ramp segment is equal to or greater than the second frequency of the first ramp segment when the slope of the first ramp segment and a slope of the second ramp segment are equal and positive. In another example, the first frequency of the second ramp segment is equal to or less than the second frequency of the first ramp segment when the slope of the first ramp segment and a slope of the second ramp segment are equal and negative.

The ADC 112 samples the first IF signal from a time instant when the first ramp segment is at the first frequency to a time instant when the first ramp segment is at the second frequency. The ADC 112 generates a first valid data from sampling of the first IF signal. The synchronization block 114 provides a data valid signal to the ADC 112 from the time instant when the first ramp segment is at the first frequency to the time instant when the first ramp segment is at the second frequency i.e. the synchronization block 114 provides the data valid signal to the ADC 112 during sampling of the first IF signal.

The ADC 112 also samples the second IF signal from a time instant when the second ramp segment is at the first frequency to a time instant when the second ramp segment is at the second frequency. The ADC 112 generates a second valid data from sampling of the second IF signal. The synchronization block 114 provides a data valid signal to the ADC 112 from the time instant when the second ramp segment is at the first frequency to the time instant when the second ramp segment is at the second frequency i.e. the synchronization block 114 provides the data valid signal to the ADC 112 during sampling of the second IF signal.

The DSP 116 further processes the first valid data and the second valid data to estimate a range of the obstacle of the one or more obstacles. The DSP 116 processes a data formed from the first valid data and the second valid data such that a range resolution obtained from processing of the data is less than the range resolution obtained from the processing of the first valid data and the processing of the second valid data independently. It is to be noted that the range resolution is defined as a smallest distance between two obstacles that is resolvable by the radar apparatus 100.

For example, a radar apparatus with a range resolution of 5 cm is better than a radar apparatus with a range resolution of 10 cm. Thus, performance of a radar apparatus with a less resolution is better. In one example, the range resolution obtained from the processing of the data corresponds to at least a sum of a bandwidth of the first ramp segment and a bandwidth of the second ramp segment. The range resolution of a radar apparatus 100 is inversely proportional to the bandwidth and is defined as R=c/2B where, B is the bandwidth of a signal transmitted by the radar apparatus 100 and c is the speed of light. In another example, the bandwidth of the first ramp segment is B1 and the bandwidth of the second ramp segment is B2, the range resolution of the radar apparatus 100 is defined as R=c/2(B1+B2).

In one example, B1 is equal to B2. In another example, the range resolution of the radar apparatus 100 is a function of the bandwidth of the first ramp segment and the bandwidth of the second ramp segment. In an additional example, the range resolution of the radar apparatus 100 is inversely proportional to the difference between the second frequency of the second ramp segment and the first frequency of the first ramp segment. In an embodiment, the DSP 116 further processes a plurality of valid data received from the ADC 112 to estimate range of the one or more obstacles and generate a point cloud of reflection points and associated information for each reflection point.

In an FMCW radar, such as a mmWave radar, a transmit signal is frequency modulated to generate a ramp segment. An obstacle scatters the ramp segment, reflecting some portions of the transmit signal back to the FMCW radar to generate a received signal. This received signal is used to generate point cloud returns whereby targets are represented by a cloud of tens to hundreds of reflection points. Generally, these points are associated with range, angular, doppler and SNR information. Generally, individual radar targets can also span multiple detectable ranges and angles with different part of the target having different doppler measurements. For example, given a radar target of a person walking toward or away from a radar, radar points associated with one leg of the person may have a different range and doppler measurements than the other leg. Similarly, as people are not flat objects, different radar points across a person would have different angle measurements. Additionally, from one radar frame, individual radar points may or may not persist across frames, for example due to changing radar reflections. Target tracking techniques help allow targets represented by multiple reflection points to be tracked across multiple frames.

Figure 2:
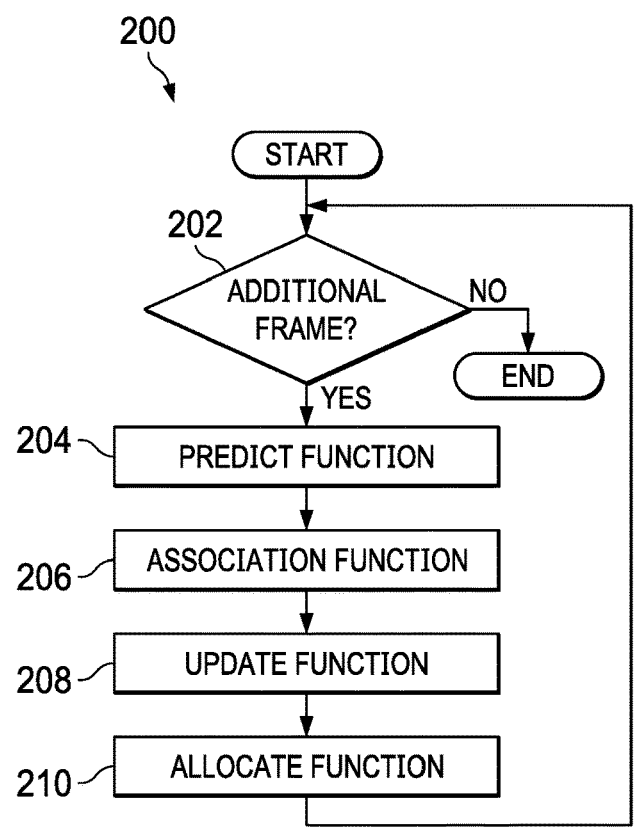
FIG. 2 is a flow chart illustrating target tracking, in accordance with aspects of the present disclosure.

A technique for target tracking can be conceptually divided into related subsets of functions. FIG. 2 provides a high level overview 200 for target tracking 200, in accordance with aspects of the present disclosure. As illustrated in FIG. 2, target tracking 200 can be divided into four broad functions performed for each radar frame received at block 202, a predict function at block 204, and association function at block 206, an update function at block 208, and allocation function at block 210.

Figure 3A:
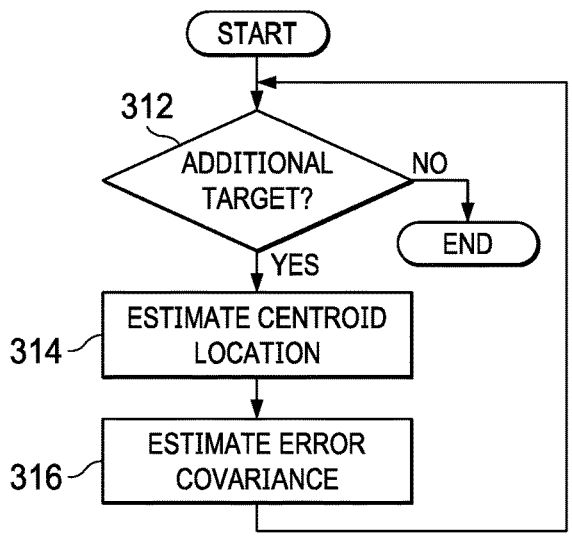
FIGS. 3A-3D are flow charts illustrating functions performed for target tracking, in accordance with aspects of the present disclosure.
Figure 5:
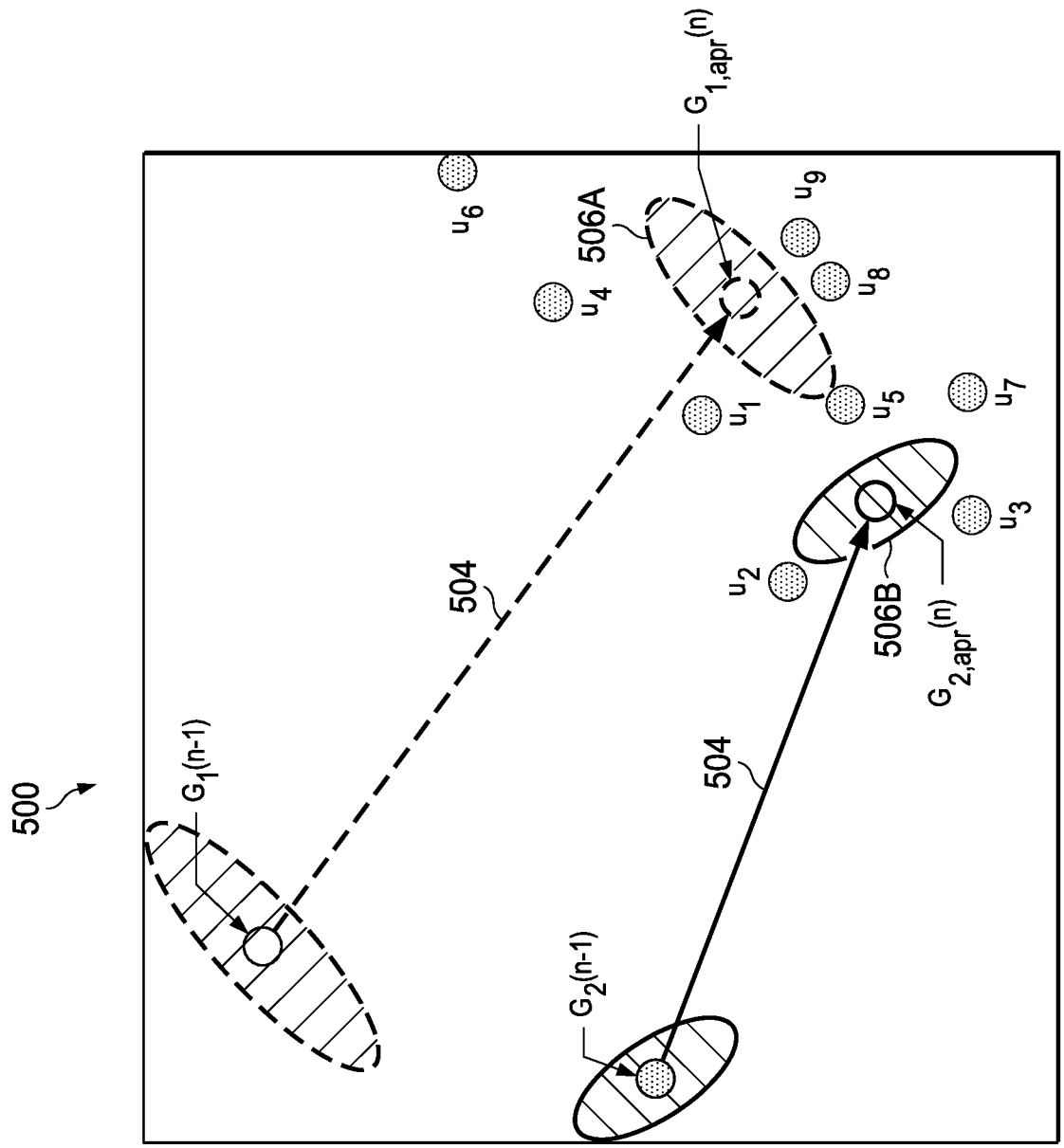
FIG. 5 illustrates a prediction operation on a point cloud, in accordance with aspects of the present disclosure.

FIG. 3A illustrates an overview of the predict function from block 204, which is further detailed in conjunction with FIG. 5. For the predict function from block 204, at block 312, for each target from a previous radar frame, a centroid location is estimated at block 314 and an error covariance estimate generated at block 316.

Figure 3B:
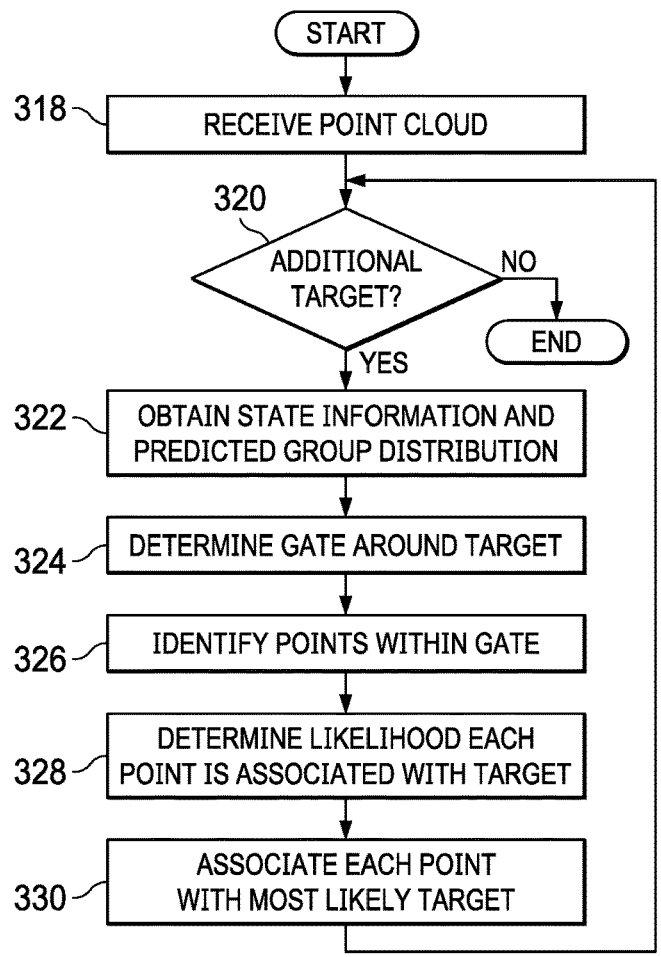
Figure 6:
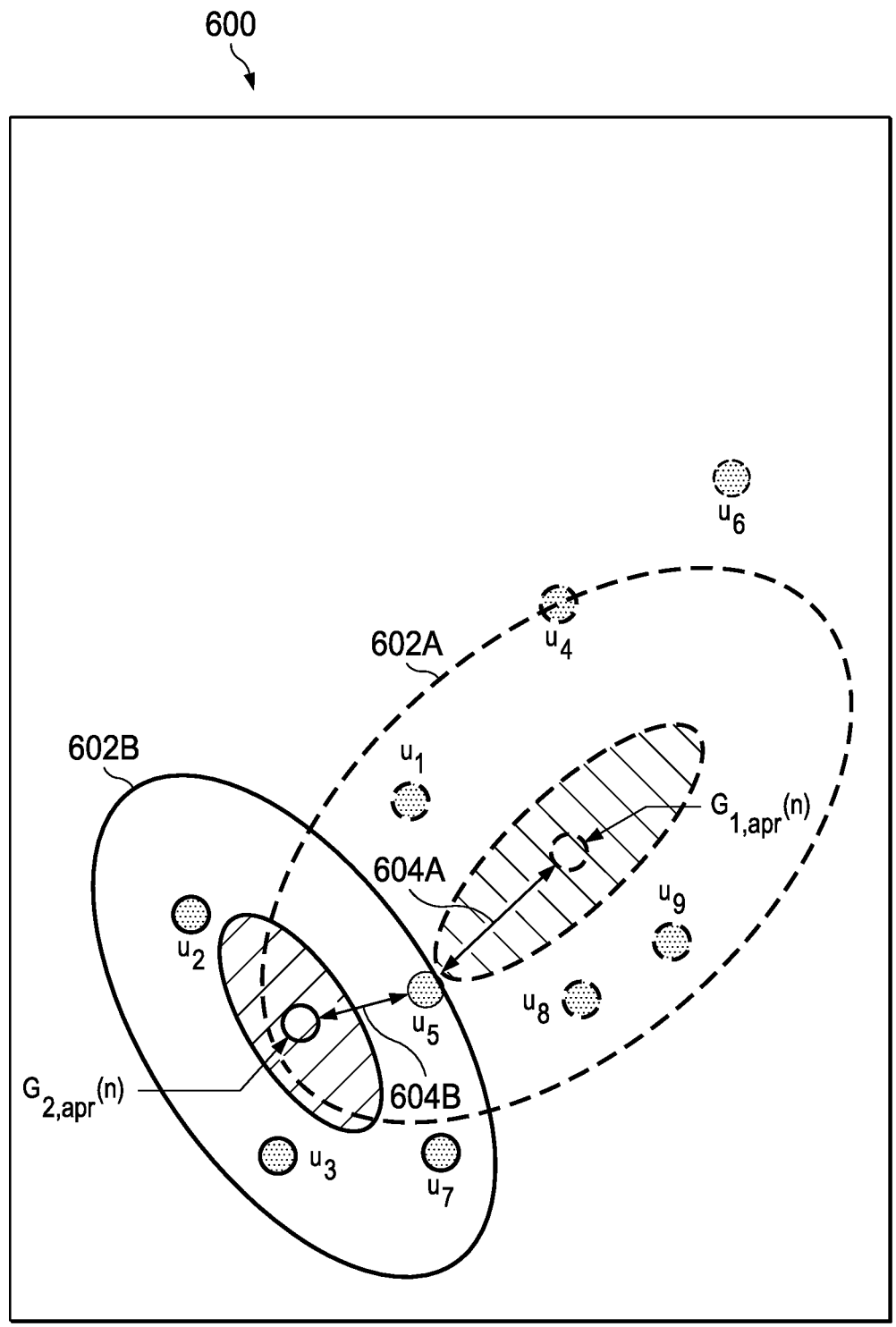
FIG. 6 illustrates a gating operation on a point cloud, in accordance with aspects of the present disclosure.

FIG. 3B illustrates an overview of the association function from block 206, which is further detailed in conjunction with FIGS. 5 and 6. For the association function from block 206, a point cloud or set of points are received at block 318. For each target, at block 320, state information and a predicted group distribution are obtained. At block 324, a gate around a corresponding target is determined. At block 326, a set of points within the gate are identified. At block 328, for each point within the gate, a likelihood that the point is associated with the target is determined. At block 330, points are associated with a most likely target. In certain cases, not all points may be associated with a target, for example if certain scoring criteria are not met or if the points do not fall within existing gates.

Figure 3C:
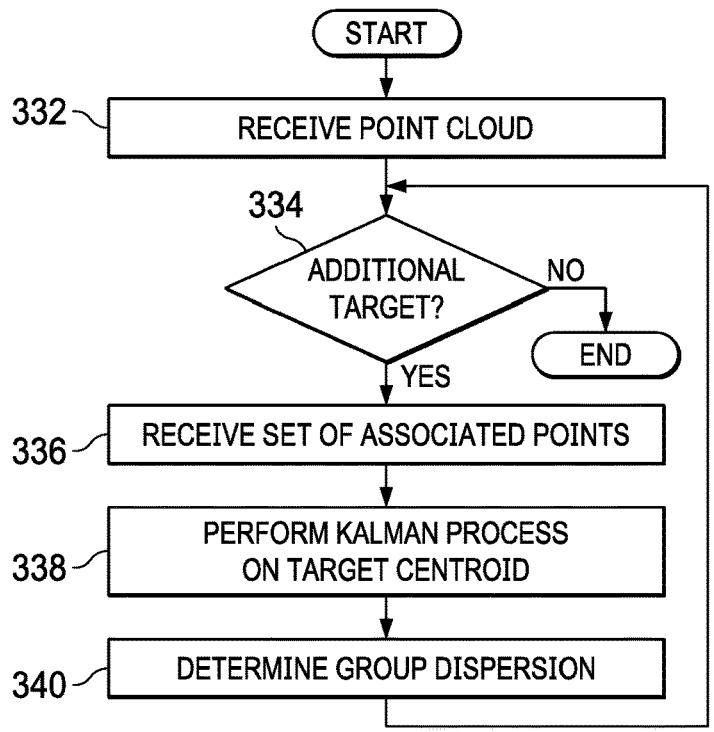
Figure 7:
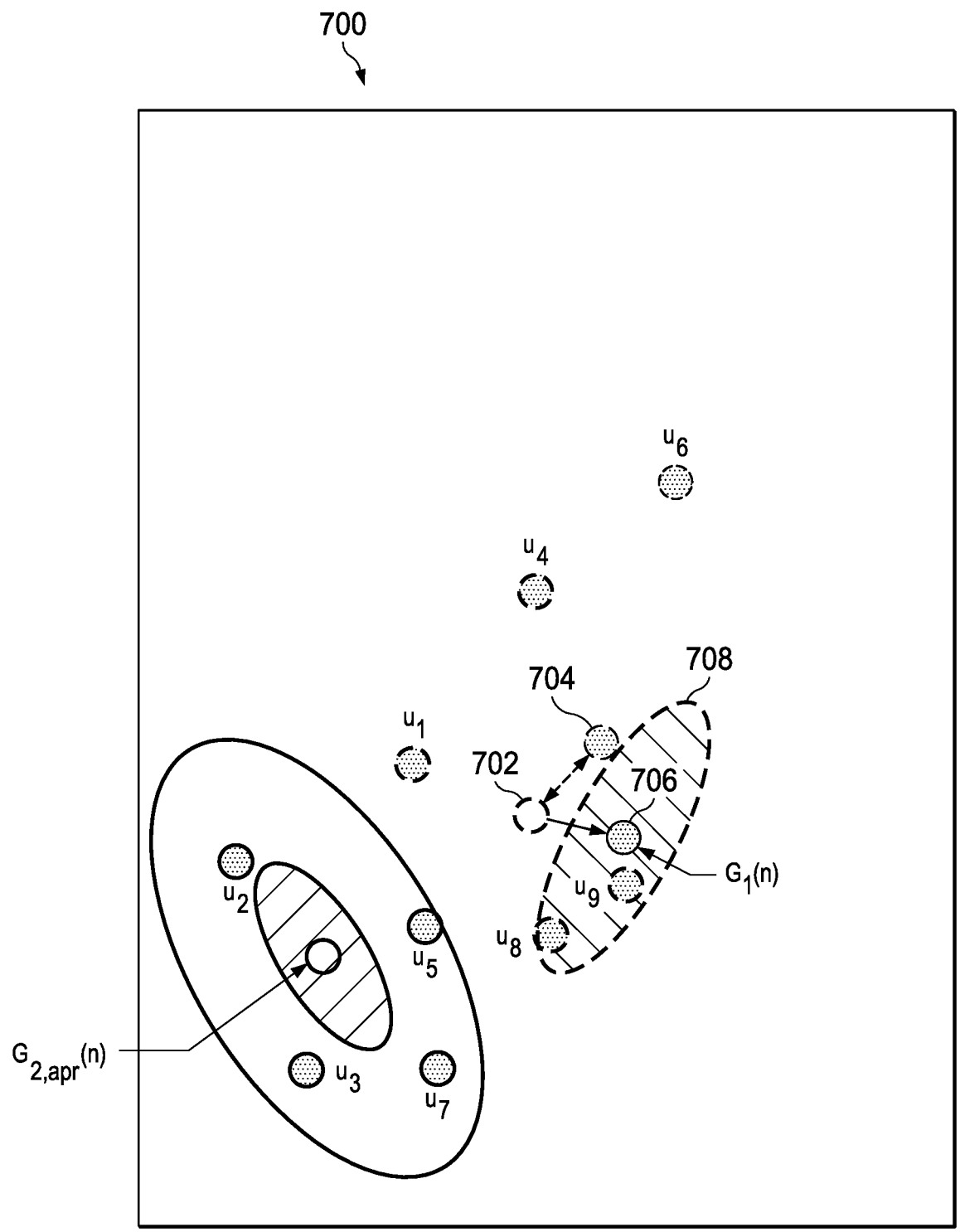
FIG. 7 illustrates an updating operation on a point cloud, in accordance with aspects of the present disclosure.

FIG. 3C illustrates an overview of the update function from block 208, which is further detailed in conjunction with FIG. 7. For the update function from block 208, at block 332, the point cloud or set of points are received. This point cloud may be the same point cloud received at block 318. For each target centroid, at block 334, a set of associated points may be received, at block 336, based, for example, on the points associated in block 330. At block 338, an extended Kalman process may be performed on the target centroid, for example, to compute innovation, innovation covariance, obtain a Kalman gain, compute a-posteriori state vector, and compute a-posteriori error covariance. At block 340, a group error covariance matrix may be determined.

Figure 3D:
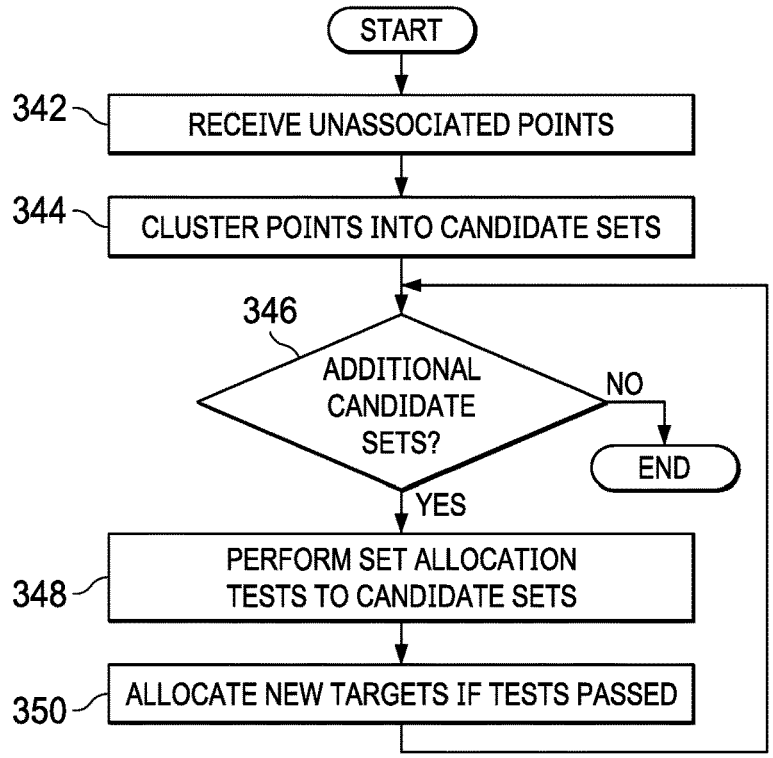

FIG. 3D illustrates an overview of the allocation function from block 210, which is further detailed in conjunction with FIG. 7. For the allocation function from block 210, at block 342, a set of unassociated points are received. At block 344, the unassociated points are clustered into candidate sets. At block 346, for each candidate set, a set of allocation tests are applied to the candidate sets at block 348. At block 350, if a particular candidate set passes the set of allocation tests, then a new target is allocated to the particular candidate set.

Figure 4A:
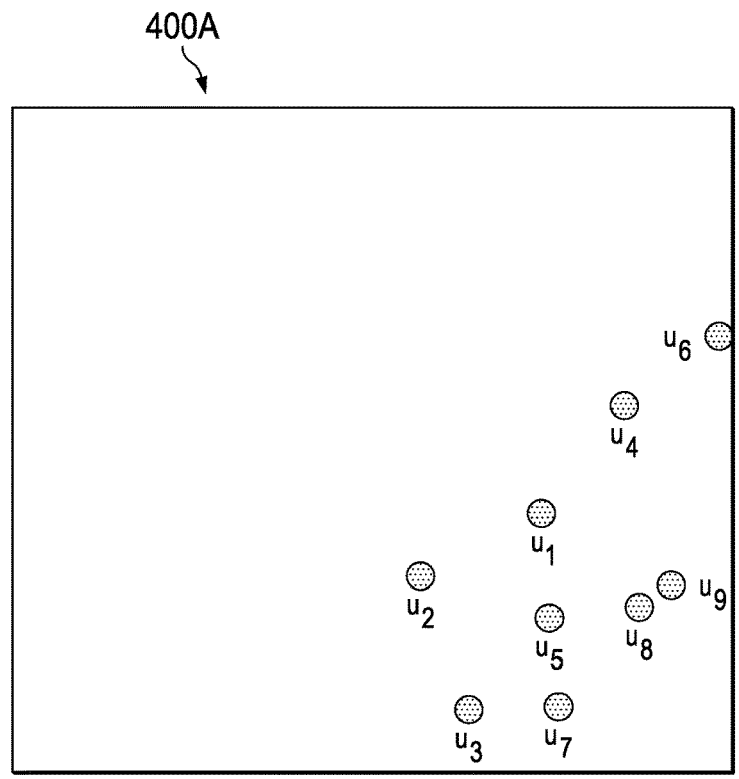
FIGS. 4A-4B illustrate point clouds, in accordance with aspects of the present disclosure.
Figure 4B:
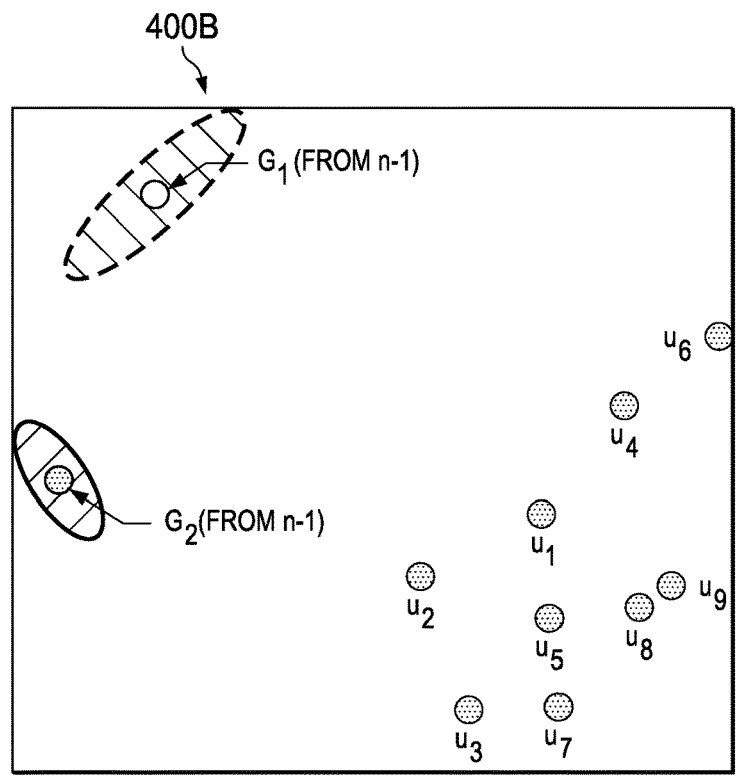

FIG. 4A illustrates point cloud 400A, in accordance with aspects of the present disclosure. Point cloud 400A includes unidentified reflection points $u_1$-$u_9$ at a current time n. FIG. 4B illustrates point cloud 400B and superimposes two objects, $G_1$ and $G_2$, which each are group target centroids obtained from a previous frame, n−1, and where $G_1$ and $G_2$ are surrounded by ellipsoids. These ellipsoids represent a group error covariance matrix computed from block 340.

As illustrated in FIG. 5, for each object $G_1$ and $G_2$, a prediction is made based on the centroid, state characteristics, and variance characteristics at frame n−1 as to a location and variance of the objects $G_1$ and $G_2$ at the present time n. The prediction attempts to predict a centroid location and variance for a previously identified tracked object. Based on the predicted state vector and predicted state vector estimation error covariance, a predicted centroid $G_{1,apr}(n)$ and $G_{2,apr}(n)$ and variance 506A and 506B may be determined, respectively, at the current time n. For example, for objects $G_1$ and $G_2$, predictions 504 may be made based on the state vector, error covariance estimate, and noise of object $G_1$ at time n−1. This prediction may be obtained by the equations $s_{ap}(n)=Fs(n-1)$ and $Papr(n)=FP(n-1)F^T+Q(n-1)$.

In the equations, $s_{apr}(n)$ represents the predicted state vector at time n, s(n−1) represents the state vector at time n−1, Papr(n) represents the predicted state vector estimation error covariance matrix at time n and P(n−1) represents the state vector estimation error covariance matrix at time n−1. F represents a Kalman filter transition matrix. One example of the Kalman filter transition matrix is:

$$F = \begin{bmatrix} 1 & 0 & \Delta t & 0 & \Delta t^2/2 & 0 \\ 0 & 1 & 0 & \Delta t & 0 & \Delta t^2/2 \\ 0 & 0 & 1 & 0 & \Delta t & 0 \\ 0 & 0 & 0 & 1 & 0 & \Delta t \\ 0 & 0 & 0 & 0 & 1 & 0 \\ 0 & 0 & 0 & 0 & 0 & 1 \end{bmatrix},$$

where Δt is a sample period and Q(n−1) represents the process noise covariance matrix at time n−1.

The choice of Q can influence the behavior of the Kalman filter. If Q is too small, then the filter may be overconfident in its prediction model and may diverge from the solution. If Q is too large, then the filter may be too influenced by noise in the measurements, potentially reducing performance. In certain cases, a piecewise white noise model, which assumes that the highest order term (such as acceleration) is constant for the duration of each time period but may differ for a next time period, may be used. Thus, there is a potential for a discontinuous jump in acceleration at each time step. With such an assumption, the expected errors due to model shortcoming may be derived as a function of the variance of the acceleration change between two samples $\sigma_v^2$ as follows:

$$Q = \begin{bmatrix} \Delta t^4/4 & 0 & \Delta t^3/2 & 0 & \Delta t^2/2 & 0 \\ 0 & \Delta t^4/4 & 0 & \Delta t^3/2 & 0 & \Delta t^2/2 \\ \Delta t^3/2 & 0 & \Delta t^2 & 0 & \Delta t & 0 \\ 0 & \Delta t^3/2 & 0 & \Delta t^2 & 0 & \Delta t \\ \Delta t^2/2 & 0 & \Delta t & 0 & 1 & 0 \\ 0 & \Delta t^2/2 & 0 & \Delta t & 0 & 1 \end{bmatrix} \sigma_v^2$$

This approach helps model the noise in terms of $\sigma_v^2$, which can be described in terms of the target motion and the amount of expected error.

Gating may then be performed for the predicted centroids. FIG. 6 illustrates a gating operation 600 on a point cloud, in accordance with aspects of the present disclosure. Gating generally draws an outer bound as to which unidentified reflection points may be considered as possibly associated with a certain tracked object. Reflection points falling outside of a gate are not considered to be associated with a respective tracked object. Gating may be thought of as the amount of innovations acceptable for a given current state of uncertainty in a current track. Generally, an innovation represents a difference between a value at time n and a forecast of that value based on information available at prior to time n. In certain cases, the amount of uncertainty may be based on a group residual covariance matrix. The group residual covariance matrix $C_G$ may be used to compute a normalized distance between each reflection point and existing track centroid. For example, for each existing track i (e.g., predicted $G_{1,apr}(n)$ and $G_{2,apr}(n)$) and for each measurement vector j obtained from unidentified reflection points $u_1$-$u_9$ at time n, a distance function $d_{ij}^2$ may be defined, representing an amount of innovation a new measurement adds to an existing track. This distance function $d_{ij}^2$ may be represented as $d_{ij}^2 \triangleq y_{ij}^T \text{inv}(C_i) y_{ij} = [u_j(n) - H_i(\hat{s}^{-1}(n))]^T \text{inv}(C_{Gi}(n))[u_j(n) - H_i(\hat{s}^{-1}(n))]$.

A chi-squared test which limits the amount of innovation may be defined as $d_{ij}^n(n) < G$. This boundary condition represents an arbitrarily oriented ellipsoid 602A and 602B centered at predicted centroid locations $G_{1,apr}(n)$ and $G_{2,apr}(n)$, respectively, while G represents a largest acceptable Mahalanobis distance between a candidate point and a centroid. The Mahalanobis distance represents a measurement of a distance as between a particular point and a distribution of points, where the measurement is made based on how many standard deviations the point is away from the mean of the distribution.

In certain cases, G may be a constant. In certain cases, using a constant G may lead to stability issues as G may be thought of as a constant volume magnifying factor to the expected errors described by $C_G$. Where the group track associates a measurement with a large, but still accepted distance, the track becomes more dispersed, the covariance matrix grows, and the gating ellipse grows as well. Conversely, the more compact the measurement, the lower the dispersion and smaller the gating ellipse. According to aspects of the present disclosure, a constant volume gating function may be used which produces a constant volume ellipsoid. Given a constant volume V, G may be computed. Using a constant volume gating function allows group tracks with significant amounts of dispersion to have a decreased gate size and reducing the aggressiveness of track acquisitions. This helps split group tracks which otherwise may include individual tracks having incompatible measurements. In certain cases, stability of the system can be enhanced by additional limiters that may not allow gating ellipses to grow beyond maximum size and shrink below a minimum size. Such limiters may be based on physical sizes of expected targets.

Once gating around the tracked objects are performed, unidentified points, such as unidentified reflection points $u_1$-$u_9$, within a gate associated with a particular tracked object may be associated with the tracked object. For unidentified points that fall within one gate associated with a single tracked object, these unidentified targets may be associated with the tracked object without scoring, such as $u_1$, $u_4$, $u_8$, and $u_9$ for $G_{1,apr}(n)$ and $u_2$, $u_{43}$, and $u_7$ for $G_{2,apr}(n)$. In certain cases, unidentified points falling within one gate may be scored and this score compared as against a threshold score. Targets that are located within multiple gates, such as $u_5$, may be scored 604A and 604B against each tracked object to determine which tracked object the target is associated with. In certain cases, scoring may be based on a likelihood function, assuming a Gaussian distribution for the reflection points. In certain cases, the scoring criteria may be represented as $D_{ij}^2 = \ln|C_i| + d_{ij}^2$, where $|C_i|$ is a determinant of the residual covariance matrix for tracked object i, $d_{ij}^2 = y_{ij}^T \text{inv}(C_i) y_{ij}$, and $y_{ij}$ is a residual vector from measurement j (e.g., $u_5$) and tracked object i. In certain cases, the scoring criteria as between the reflection point (e.g., $u_5$) and each tracked object may be found and the reflection point may be associated with the tracked object with which the score criteria is minimized for (e.g., with the tracked object that the reflection point is most likely to be a part of).

FIG. 7 illustrates an updating operation 700 on a point cloud, in accordance with aspects of the present disclosure. Tracked objects may be updated based on the set of associated reflection points. In certain cases, a mean 702 of all associated reflection points may be determined. This mean 702 may be, represented as $\bar{u}(n)$. In this example, mean 702 is based on $u_1$, $u_4$, $u_8$, and $u_9$ points associated with tracked object $G_1(n)$. An innovation 704 may be determined based on the mean of all associated reflection points as $y(n) = \bar{u}(n) - H(S_{apr}(n))$. This innovation may be used to compute an updated centroid 706. A residual centroid covariance matrix may be computed based on the equation $C_c = J_H (S_{apr}(n)) P_{apr}(n) j_H^T (S_{apr}(n)) + R_c$, where $R_c$ is a measurement noise covariance matrix computed based on $$R_c = \frac{R_D}{N_A} + f(N_A, \hat{N}) C_D.$$

Here, $C_D$ is an estimation of a group track dispersion matrix, $N_A$ is a number of reflection points associated with a given tracked object, $\hat{N}$ is an estimated number of elements in the tracked object, and $f(N_A,\hat{N})$ is a weighting factor that is a function of the number of reflection points and estimated number of elements in the tracked target. In the above residual centroid covariance matrix equation, $$\frac{R_D}{N_A}$$

represents the error in measuring the centroid due to radar measurement error and is decreased by a number of reflection points (e.g., measurements) associated with the target group centroid. The term $f(N_A,\hat{N})$ represents the uncertainty due to not all elements being observed. A weighting factor may be defined for the case where there are no false detections ($N_A \leq \hat{N}$) as $$f(N_A, \hat{N}) = \frac{\hat{N} - N_A}{(\hat{N} - 1)N_A},$$

with limits on as defined as $f(N_A, \hat{N}=0$, when all elements are detected, and $f(N_A, \hat{N}=1$ when a single associated reflection point is received. $\hat{N}$ may be used as a configuration parameter and $C_D$ may be estimated recursively as $C_D=(1-\alpha)C_D(n-1)+\alpha D$. The measurement vector may be $u(n)=[r(n) \varphi(n) r'(n)]^T$ and dispersion matrix may be $$D = \begin{bmatrix} d_{rr}^2 & d_{r\varphi}^2 & d_{r\dot{r}}^2 \\ d_{r\varphi}^2 & d_{\varphi\varphi}^2 & d_{\varphi\dot{r}}^2 \\ d_{r\dot{r}}^2 & d_{\varphi\dot{r}}^2 & d_{\dot{r}\dot{r}}^2 \end{bmatrix},$$

where $$d_{ab}^2 \triangleq \frac{1}{N}\sum_{i=1}^{N}(a_i - \bar{a})(b_i - \bar{b})$$

and a, b $\in \{r,\varphi,\dot{r}\}$, and $\bar{a}$, $\bar{b}$ are means computed for a given group of measurements in a standard manner. After determining $R_c$, the Kalman gain, state, and covariance matrices may be determined. The Kalman gain may be determined by the function $K(n)=P_{apr}(n)J_H^T(S_{apr}(n))\text{inv}[C(n)]$, the state vector may be determined by the function $s(n)=s_{apr}(n)+K(n)y(n)$, and the error covariance may be determined by the function $P(n)=P_{apr}(n)-K(n)J_H(S_{apr}(n))P_{apr}(n)$.

The state vector, error covariance, and noise associated with a tracked object may be used to update a group residual covariance 708 for the tracked object $G_i(n)$. This group residual covariance matrix $C_G$ may be represented as $C_G=J(s_{apr}(n))P_{apr}(n) J_H^T(s_{apr}(n))+R_G+C_D$. The term $J(s_{apr}(n)) P_{apr}(n) J_H^T(s_{apr}(n))$ represents an uncertainty in the predicted centroid due to target maneuvering and is similar to the term used for individual target tracking. The term $R_G$ is a measurement error covariance matrix. The term $C_D$ is an estimation of a group track dispersion matrix. The group residual covariance matrix $C_G$ may be between a member of the measurement group, here unidentified reflection points $u_1$-$u_9$, and the predicted group centroid. Additionally, the state vector, error covariance can be used to predict location and variance characteristics for the tracked object at n+1 time.

Reflection points that are outside of any existing gates, such as $u_6$, and thus not associated with any track may be grouped into a new group track. New tracks may be determined by first selecting a leading unassociated reflection point as a first candidate point and setting a centroid with a range and angle equal to the first candidate point. In certain cases, the leading unassociated reflection point may be randomly selected among the unassociated points and the leading unassociated reflection point may be used to seed the clustering process around the point. A set of tests may be performed based on the centroid and other unassociated points. For example, the other candidate point may be checked to see if it is within relative velocity and distance bounds. If the other candidate point is within such bounds, then the other candidate is added to a cluster and a centroid is recalculated. Once all other candidate points have been evaluated and added as appropriate to the cluster, qualifying checks may be performed for the cluster. Examples of such qualifying checks may include a minimum number of reflection points, a strong enough combined signal-to-noise ratio, and/or a minimal amount of dynamicity (e.g., minimum amount of movement) of the cluster centroid. If the cluster passes the qualifying checks, a new tracking object may be created based on the cluster and the associated reflection points used to initialize dispersion matrices for the new tracking object. Reflection points which are not associated with an existing tracking object or a new tracking object may be ignored.

Figure 8:
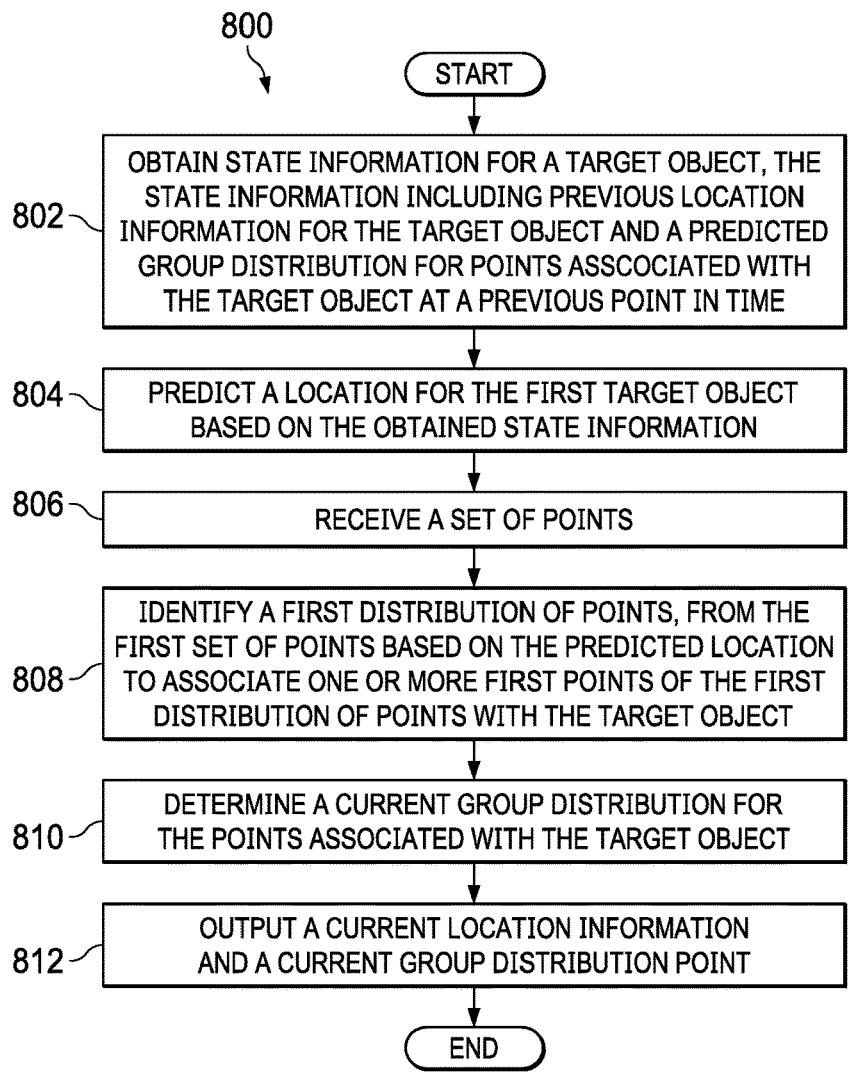
FIG. 8 is a flowchart illustrating a technique for target tracking, in accordance with aspects of the present disclosure.

FIG. 8 is a flow chart illustrating a technique for target tracking 800, in accordance with aspects of the present disclosure. At step 802, state information for a target object is obtained. The state information can include information such as the state vector, the error covariance matrix of target centroid, and group error covariance matrix that represents the distribution of the points associated with a given target at a previous point in time. According to aspects of the present disclosure, prior to the current time n, one or more target objects were identified and state information related to the target objects were stored. In certain cases, state information is obtained for each tracked target object. At step 804, a location for the first target object is predicted based on the obtained state information. For example, the state vector and error covariance for the target object at time n−1 may be used to predict the new state vector and variance of the target object at time n. This prediction may be based on, for example, an extended Kalman filter. At step 806, a set of points are received. For example, a point cloud of unidentified reflection points at a current time n may be received from the radar device. At step 808, a distribution of points may be identified, from the set of points based on the predicted location to associate one or more first points of the first distribution of points with the target object. For example, the distribution of points may be based on associating the set of points with the target centroids. In certain cases, the distribution of points comprises points within the gate around the centroid. For example, unidentified points from the point cloud falling within the gating function may be identified. In certain cases, a distance between each point and the distribution of points may be identified. For example, for a point, a measurement of the Mahalanobis distance as between the point and the group may be made. In certain cases, one or more first points of the set of points may be within the gate of multiple targets. In those cases, the maximum likelihood criteria of the point belonging to the competing tracks can be computed. This criteria can be based on group error covariance matrix and Mahalanobis distance. The point is associated with most likely target. At step 810, a current group distribution may be determined. In certain cases, the current group distribution may be based a computed state vector and error covariance matrix computed based on the current points. For example, after points associated with the target object are determined, a current distribution may be determined. At step 812, a current location information and current group distribution point is output for use, for example, by higher level processing, such as by a visualizer or other scene recognizer or interpreter.

Figure 9:
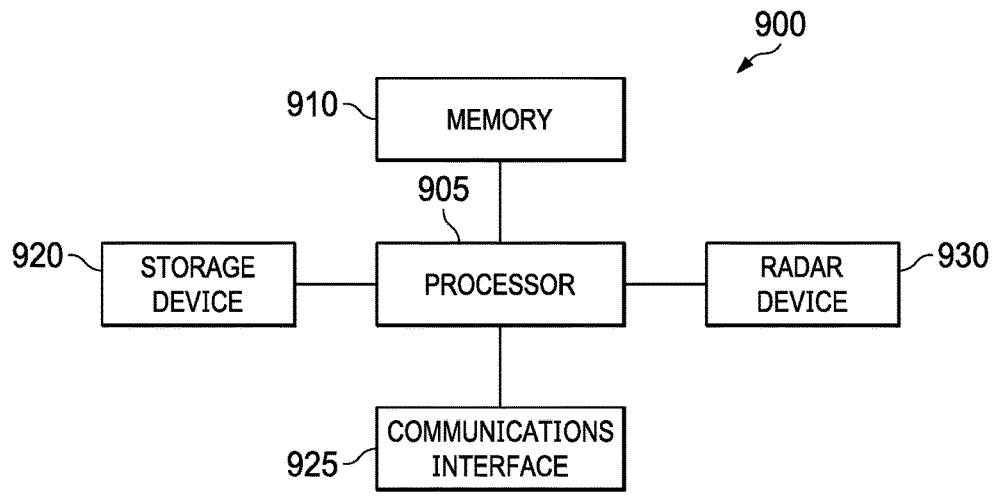
FIG. 9 is a is a block diagram of an embodiment of a device, in accordance with aspects of the present disclosure.

As illustrated in FIG. 9, device 900 includes a processing element such as processor 905 that contains one or more hardware processors, where each hardware processor may have a single or multiple processor cores. Examples of processors include, but are not limited to a central processing unit (CPU) or a microprocessor. Although not illustrated in FIG. 9, the processing elements that make up processor 905 may also include one or more other types of hardware processing components, such as graphics processing units (GPUs), application specific integrated circuits (ASICs), field-programmable gate arrays (FPGAs), and/or digital signal processors (DSPs).

FIG. 9 illustrates that memory 910 may be operatively and communicatively coupled to processor 905. Memory 910 may be a non-transitory computer readable storage medium configured to store various types of data. For example, memory 910 may include one or more volatile devices such as random access memory (RAM). Non-volatile storage devices 920 can include one or more disk drives, optical drives, solid-state drives (SSDs), tap drives, flash memory, electrically programmable read only memory (EEPROM), and/or any other type memory designed to maintain data for a duration time after a power loss or shut down operation. The non-volatile storage devices 920 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process steps to processor 905 from storage 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 900. Storage 920 may be partitioned or split into multiple sections that may be accessed by different software programs. For example, storage 920 may include a section designated for specific purposes, such as storing program instructions or data for updating software of the computing device 900. In one embodiment, the software to be updated includes the ROM, or firmware, of the computing device. In certain cases, the computing device 900 may include multiple operating systems. For example, the computing device 900 may include a general-purpose operating system which is utilized for normal operations. The computing device 900 may also include another operating system, such as a bootloader, for performing specific tasks, such as upgrading and recovering the general-purpose operating system, and allowing access to the computing device 900 at a level generally not available through the general-purpose operating system. Both the general-purpose operating system and another operating system may have access to the section of storage 920 designated for specific purposes.

Computing device 900 may also include one or more radar devices 925 which may be communicatively coupled to processor 905. The one or more communications interfaces may include a radio communications interface for interfacing with one or more radio communications devices. In certain cases, elements coupled to the processor may be included on hardware shared with the processor. For example, the communications interfaces 925, storage, 920, and memory 910 may be included, along with other elements such as the digital radio, in a single chip or package, such as in a system on a chip (SOC). Computing device 900 may also include a radar device 930, such as that described in conjunction with FIG. 1. Computing device may also include input and/or output devices, not shown, examples of which include sensors, cameras, human input devices, such as mouse, keyboard, touchscreen, monitors, display screen, tactile or motion generators, speakers, lights, etc. Processed input, for example from the radar device 930, may be output from the computing device 900 via the communications interfaces 925 to one or more other devices.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

In the drawings, like elements are denoted by like reference numerals for consistency.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A method for target tracking, the method comprising:
    obtaining state information for a first target object, the state information including previous location information for the first target object and a previous group distribution for points associated with the first target object at a previous point in time;
    predicting a first location for the first target object based on the obtained state information;
    determining a first gate around the first location;
    predicting a second location for a second target object;

determining a second gate around the second location;
receiving a point cloud including a first point;
determining that the first point is located within the first gate;
determining that the first point is located within the second gate;
determining a first likelihood that the first point is associated with the first target object;
determining a second likelihood that the first point is associated with the second target object; and
associating the first point with first target object based on the first and second likelihoods.

2. The method of claim 1, wherein predicting the first location of the first target object comprises:
estimating a variance based on the state information;
estimating a centroid location for the first target object based on the state information;
wherein determining the first gate is based on the estimated variance, and
wherein the method further comprises:
determining a first distribution of points of the point cloud that are within the first gate around the first location,
determining a first distance between each point in the point cloud and the first distribution of points; and
associating a subset of points of the first distribution of points within the first gate with the first target object based on the determined first distance.

3. The method of claim 2, wherein the first distance is measured as a function of a number of standard deviations that a respective point is from the first distribution of points.

4. The method of claim 2, wherein the first gate comprises a constant volume ellipsoid around the centroid location.

5. The method of claim 2, wherein the subset of points includes the first point, and wherein the associating the subset of points within the first gate with the first target object comprises:
determining that the first point is within the second gate associated with the second target object;
determining a second distance between the first point and a second distribution of points of the point cloud that are within the second gate around the second location; and
associating the first point with the first target object based on a comparison between the first distance and the second distance.

6. The method of claim 2, wherein the subset of points is a first subset of points, the method further comprising:
determining a second subset of points of the point cloud, wherein points of the second subset of points are unassociated with any target objects;
selecting a third point of the second subset of points;
performing one or more allocations tests comparing the third point to other points of the second subset of points; and
generating a new tracking object based at least in part of the allocation tests.

7. The method of claim 1, wherein the point cloud comprises unidentified reflection points.

8. The method of claim 1, wherein the first location is used as the previous location information for the first target object at a later point in time.

9. A device, the device comprising:
a memory; and
one or more processors operatively coupled to the memory, wherein the one or more processors are configured to execute non-transitory instructions causing the one or more processors to:
obtain state information for a first target object, the state information including previous location information for the first target object and a previous group distribution for points associated with the first target object at a previous point in time;
predict a first location for the first target object based on the obtained state information;
determine a first gate around the first location;
predict a second location for a second target object;
determine a second gate around the second location;
receive a point cloud including a first point;
determine that the first point is located within the first gate;
determine that the first point is located within the second gate;
determine a first likelihood that the first point is associated with the first target object;
determine a second likelihood that the first point is associated with the second target object; and
associate the first point with first target object based on the first and second likelihoods.

10. The device of claim 9, wherein the non-transitory instructions to predict the first location of the first target object comprise instructions to:
estimating a variance based on the state information;
estimating a centroid location for the first target object based on the state information;
wherein the non-transitory instructions to determine the first gate comprise instructions to determine the first gate based on the estimated variance, and
wherein the non-transitory instructions stored thereon further cause the one or more processors to:
determine a first distribution of points of the point cloud that are within the first gate around the first location, wherein the first distribution of points comprises points within the first gate around the first location;
determine a first distance between each point in the point cloud and the first distribution of points;
associate a subset of points of the first distribution of points within the first gate with the first target object based on the determined first distance.

11. The device of claim 10, wherein the first distance is measured as a function of a number of standard deviations that a respective point is from the first distribution of points.

12. The device of claim 10, wherein the first gate comprises a constant volume ellipsoid around the centroid location.

13. The device of claim 10, wherein the subset of points includes the first point, and wherein the non-transitory instructions stored thereon further cause the one or more processors to associate the subset of points within the first gate with the first target object by:
determining that the first point is within the second gate associated with the second target object;
determining a second distance between the first point and a second distribution of points of the point cloud that are within the second gate around the second location; and
associating the first point with the first target object based on a comparison between the first distance and the second distance.

14. The device of claim 10, wherein the subset of points is a first subset of points, and wherein the non-transitory instructions stored thereon further cause the one or more processors to:
- determine a second subset of points of the point cloud, wherein points of the second subset of points are unassociated with any target objects;
- select a third point of the second subset of points;
- perform one or more allocations tests comparing the third point to other points of the second subset of points; and
- generate a new tracking object based at least in part of the allocation tests.

15. The device of claim 9, wherein the point cloud comprises unidentified reflection points.

16. The device of claim 9, wherein the first location is used as the previous location information for the first target object at a later point in time.

17. A non-transitory program storage device comprising instructions stored thereon to cause one or more processors to:
- obtain state information for a first target object, the state information including previous location information for the first target object and a previous group distribution for points associated with the first target object at a previous point in time;
- predict a first location for the first target object based on the obtained state information;
- determine a first gate around the first location;
- predict a second location for a second target object;
- determine a second gate around the second location;
- receive a point cloud including a first point;
- determine that the first point is located within the first gate;
- determine that the first point is located within the second gate;
- determine a first likelihood that the first point is associated with the first target object;
- determine a second likelihood that the first point is associated with the second target object; and
- associate the first point with first target object based on the first and second likelihoods.

18. The non-transitory program storage device of claim 17, wherein predicting the first location of the first target object comprises:
- estimating a variance based on the state information;
- estimating a centroid location for the first target object based on the state information;
- wherein the instructions to determine the first gate comprise instructions to determine the first gate based on the estimated variance, and
- wherein the instructions stored thereon further cause the one or more processors to:
  - determine a first distribution of points in the point cloud that are within the first gate around the first location, wherein the first distribution of points comprises points within the first gate around the first location;
  - determine a first distance between each point in the point cloud and the first distribution of points;
  - associate a subset of points of the first distribution of points within the first gate with the first target object based on the determined first distance.

19. The non-transitory program storage device of claim 18, wherein the first distance is measured as a function of a number of standard deviations that a respective point is from the first distribution of points.

20. The non-transitory program storage device of claim 18, wherein the first gate comprises a constant volume ellipsoid around the centroid location.

* * * * *